(12) United States Patent
Nakai

(10) Patent No.: US 10,432,123 B2
(45) Date of Patent: Oct. 1, 2019

(54) CONTROL APPARATUS FOR AC MOTOR

(71) Applicant: DENSO CORPORATION, Kariya, Aichi-pref. (JP)

(72) Inventor: Yasuhiro Nakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/079,727

(22) PCT Filed: Feb. 22, 2017

(86) PCT No.: PCT/JP2017/006560
§ 371 (c)(1),
(2) Date: Aug. 24, 2018

(87) PCT Pub. No.: WO2017/146090
PCT Pub. Date: Aug. 31, 2017

(65) Prior Publication Data
US 2019/0052211 A1 Feb. 14, 2019

(30) Foreign Application Priority Data
Feb. 24, 2016 (JP) .................................. 2016-032899

(51) Int. Cl.
*H02P 21/22* (2016.01)
*H02P 27/08* (2006.01)

(52) U.S. Cl.
CPC ............. *H02P 21/22* (2016.02); *H02P 27/08* (2013.01)

(58) Field of Classification Search
CPC .......... H02P 21/22; H02P 21/06; H02M 1/12; H02M 7/53871; H02M 7/539
See application file for complete search history.

(56) References Cited

U.S. PATENT DOCUMENTS 7,358,698 B2 * 4/2008 Seguchi ................. H02K 19/28
310/180
7,400,102 B2 * 7/2008 Hobraiche ........ H02M 7/53875
318/254.1
(Continued)

FOREIGN PATENT DOCUMENTS

JP 2017-153226 A 8/2017

*Primary Examiner* — Shawki S Ismail
*Assistant Examiner* — Zoheb S Imtiaz
(74) *Attorney, Agent, or Firm* — Oliff PLC

(57) ABSTRACT

A current controller calculates a drive signal by means of fundamental wave current control and high-order current control, for driving an inverter. A $5^{th}$ order/$7^{th}$ order voltage command calculation section calculates a $5^{th}$ order/$7^{th}$ order voltage command vector $Vd_k^*$, $Vq_k^*$ by means of feedback control which makes a high-order dq transformation value extracted from the actual current coincide with a $5^{th}$ order/$7^{th}$ order current command value $Id_k^*$, $Iq_k^*$. A $5^{th}$ order/$7^{th}$ order vector transformation section executes high-order vector transformation processing on the $5^{th}$ order/$7^{th}$ order voltage command vector $Vd_k^*$, $Vq_k^*$ that is calculated by the $5^{th}$ order/$7^{th}$ order voltage command calculation section, with the high-order vector transformation processing being executed such as to make a high-order voltage vector and a high-order current vector coincide in phase in high-order dq coordinates, and with the high-order vector transformation processing including rotation transformation by high-order vector rotation which rotates a high-order vector.

5 Claims, 8 Drawing Sheets

(56) References Cited

U.S. PATENT DOCUMENTS

| | | | | |
|---|---|---|---|---|
| 2002/0097015 A1 | 7/2002 | Kitajima et al. | | |
| 2005/0242767 A1* | 11/2005 | Ho | ............ | H02P 21/22 |
| | | | | 318/808 |
| 2015/0357953 A1* | 12/2015 | Seok | ............ | B60L 15/025 |
| | | | | 318/400.02 |

* cited by examiner

FIG.4
FUNDAMENTAL WAVE
<FIXED COORDINATES>
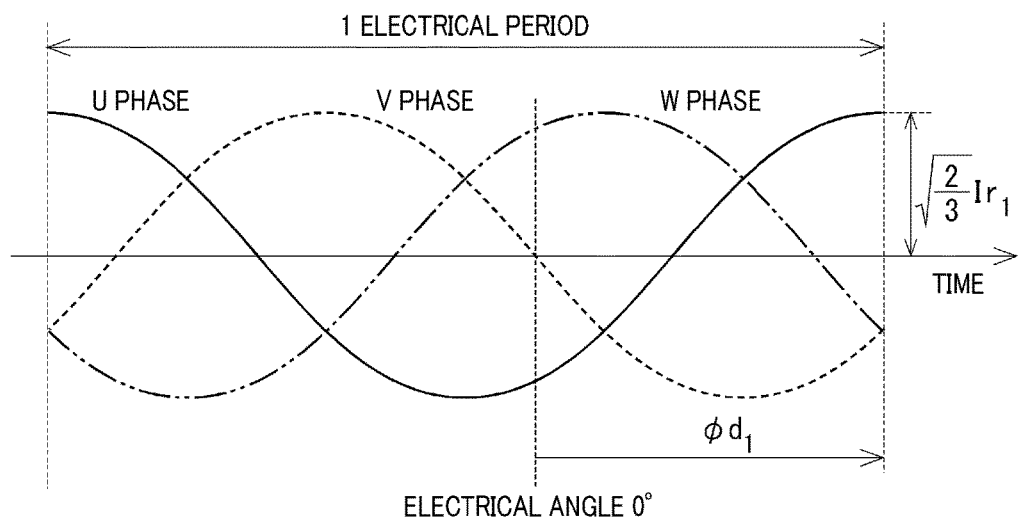
ELECTRICAL ANGLE 0°
⇩ dq TRANSFORMATION
<dq COORDINATES>
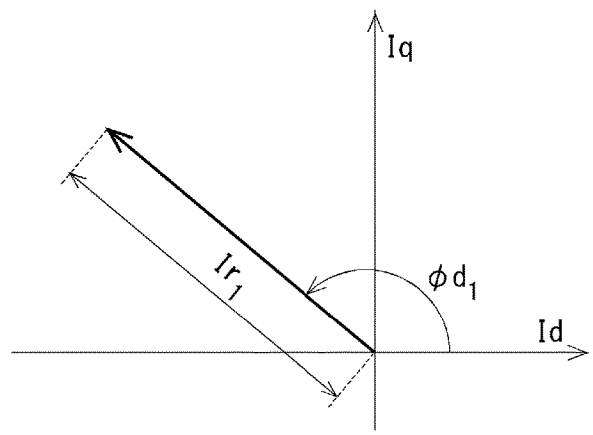

FIG.5
-5th ORDER COMPONENT
<FIXED COORDINATES>
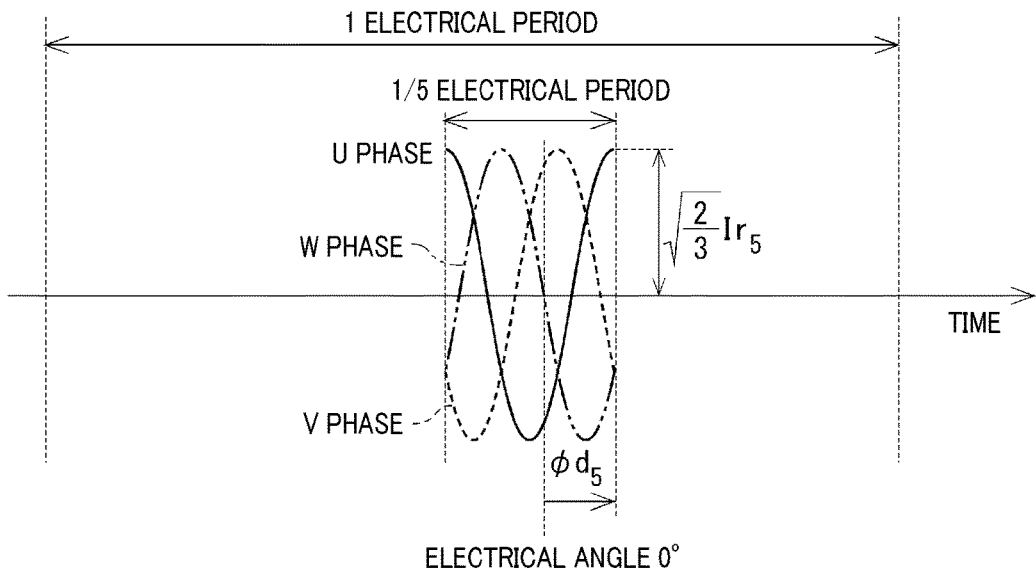
<dq COORDINATES>
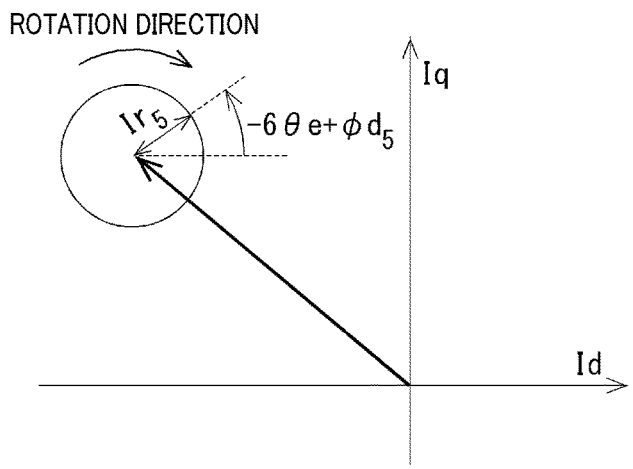

ROTATION TRANSFORMATION

ROTATION TRANSFORMATION + MAGNITUDE CONVERSION

CONTROL APPARATUS FOR AC MOTOR

CROSS-REFERENCE TO RELATED APPLICATION

This application is based on and claims the benefit of priority from earlier Japanese Patent Application No. 2016-032899 filed on Feb. 24, 2016, the disclosures of which are incorporated herein by reference.

TECHNICAL FIELD

The present disclosure relates to AC motor control technology for controlling the energizing of a polyphase AC motor by current feedback control.

BACKGROUND ART

It is known that in vector control of a polyphase AC motor, high-frequency components become superimposed on the fundamental wave component of the phase current, due to non-uniformity of magnetization of the rotor magnet constituting the AC motor and due to the shapes of the rotor and the stator. For example in the case of the AC motor disclosed in Patent Literature 1 (PTL 1), high-frequency components of the actual current are converted to direct current by high-order dq transformation, and feedback control is executed on a high-order current command value that is set as zero.

CITATION LIST

Patent Literature

[PTL 1] JP 3809783 B

SUMMARY OF THE INVENTION

Technical Problem

With the motor control apparatus disclosed in the "first embodiment" of PTL 1, a high-order dq-axes current control section calculates high-order dq-axes voltage command values vdh*, vqh*, for making the high-order dq-axes actual current values idh*, iqh* coincide with the current command values idh*=0, iqh*=0. A specific control configuration is not disclosed, however it can be inferred that the high-order dq-axes current control section applies feedback control by proportional-integral calculation with respect to the d-axis and the q-axis respectively, in the same manner as for fundamental wave current control.

However in general, the phases of the current vector and the voltage vector will not coincide on the dq-axes, and there will be a phase difference. If that phase difference becomes large, then the motor control may become unstable, depending on the configuration and characteristics of the AC motor.

It is an objective of the present disclosure to provide an AC motor control technology which provides phase matching between the high-order voltage vector and the high-order current vector, and provides stability of control.

[Solution of Problem]

An AC motor control apparatus which is one form of the technology of the present disclosure, is equipped with an inverter (40) that supplies electric power to a polyphase AC motor (80), and a current controller (30) that controls energizing of the AC motor, with the electric power being converted by operation of a plurality of switching elements (41 to 46).

The current controller calculates a drive signal for driving the inverter through "fundamental wave current control" and "high-order current control". The "fundamental wave current control" consists of control for causing the first-order component of the feedback current to coincide with the current command vector of the fundamental wave in dq coordinates. The "high-order current control" consists of control for causing one or more specific high-order components, extracted from the actual feedback current, to coincide with the high-order current command vector in high-order dq coordinates.

The current controller has high-order voltage command calculation sections (55, 75) and high-order vector transformation sections (57, 77).

A high-order voltage command calculation section calculates a high-order voltage command vector through feedback control which causes a high-order component having a specific order, extracted from the actual current, to coincide with a high-order dq-axes current command value.

A high-order vector transformation section executes "high-order vector transformation processing" that includes "rotation transformation" which rotates a high-order vector. Specifically, the high-order vector transformation section applies high-order vector rotation to a high-order current vector deviation that is inputted to a high-order voltage command calculation section, or a high-order current vector that is calculated by the high-order voltage command calculation section, with the vector rotation being applied such as to make a high-order voltage vector and the high-order current vector coincide in phase in high-order dq coordinates.

In this way, the high-order vector transformation section executes high-order vector transformation processing on the high-order current vector deviation or the high-order voltage command vector. As a result, the control apparatus of the present disclosure stabilizes the motor control.

It should be noted that in addition to rotation transformation, it is possible for the high-order vector transformation processing to include "amplitude transformation", which multiplies the amplitude of a high-order vector by a gain which is other than 1.

The current controller further includes transformation quantity setting sections (56, 76), where a transformation quantity setting section sets the rotation angle of a rotation transformation and the gain of an amplitude transformation in accordance with a fundamental wave command value and the rotation speed of the AC motor, as the transformation quantities for the high-order transformation processing.

In this way, the current controller sets the rotation angle of the rotation transformation and the gain of the amplitude transformation in accordance with the operating conditions of the AC motor, such as the current value or rotation speed, etc. The control apparatus of the present disclosure thereby fixes the responsiveness of feedback control, irrespective of the operating point.

BRIEF DESCRIPTION OF THE DRAWINGS

FIG. 4 is diagram showing the relationship between a fixed coordinate system and a dq coordinate system, for the fundamental wave.

FIG. 5 is a diagram showing the relationship between a fixed coordinate system and a dq coordinate system, for a phase current $(-5)^{th}$ order component.

DESCRIPTION OF EMBODIMENTS

An embodiment of a control apparatus for an AC motor, which is one form of the technology of the present disclosure, is described in the following. The AC motor control apparatus of this embodiment controls the energizing of a 3-phase AC motor MG in a system (hereinafter referred to as "MG drive system") that drives a motor-generator (hereinafter referred to as "MG") which is the motive power source of a hybrid automobile or an electric automobile. With this embodiment, the "MG" and "MG controller" correspond to a "polyphase AC motor" and an "AC motor control apparatus" as recited in the scope of the claims.

(First Embodiment)
[System Configuration]

Figure 1:
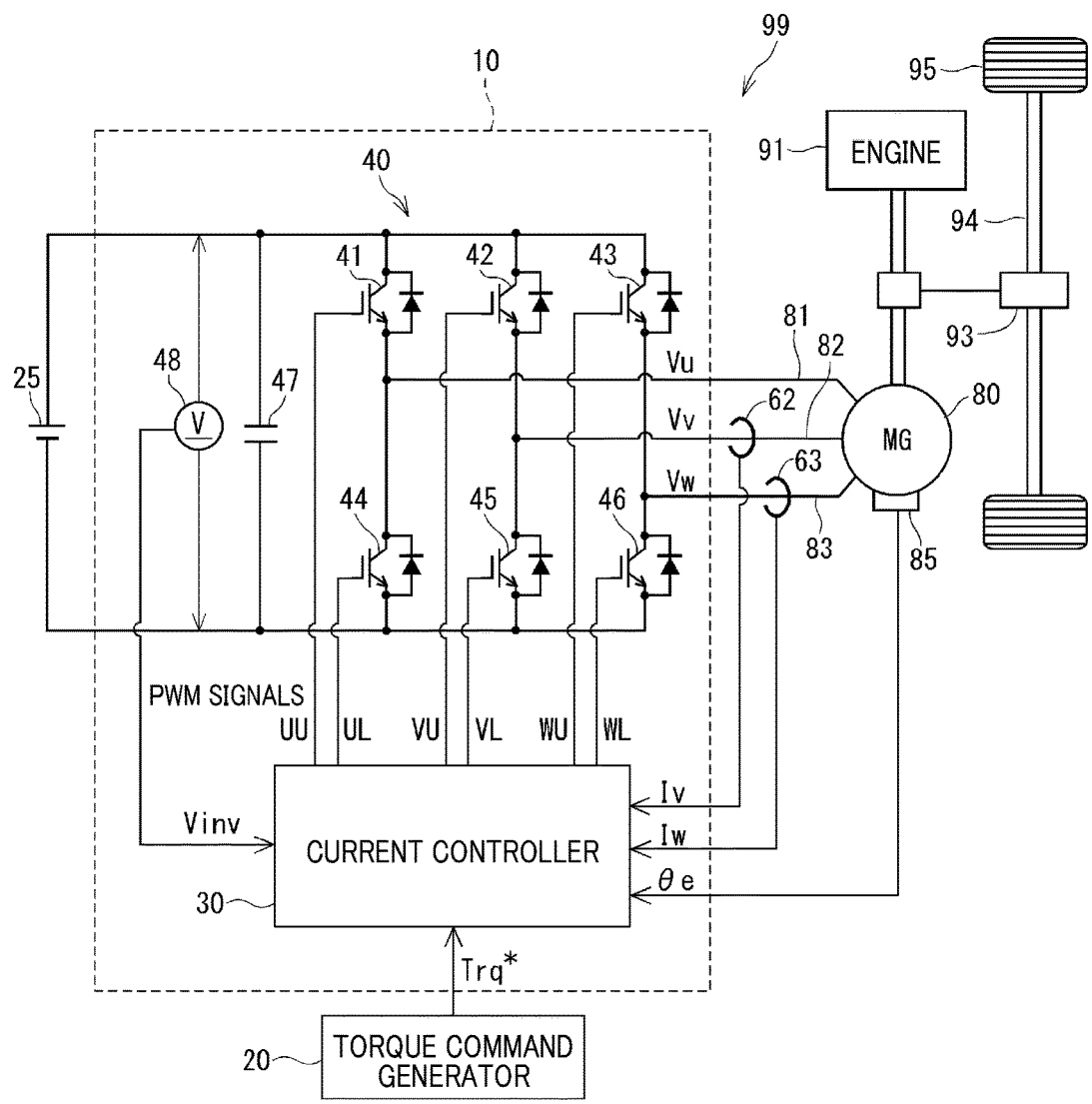
FIG. 1 is a configuration diagram showing the outline of a motor-generator drive system to which an AC motor control apparatus according to a first embodiment is applied.

The overall configuration of the MG drive system of this embodiment will be described referring to FIG. 1. FIG. 1 shows a system provided for a single MG. A MG drive system 99 that is installed in a hybrid automobile converts the DC electric power from a battery 25, which is a rechargeable secondary battery, to 3-phase AC power by an inverter 40. The MG drive system 99 supplies the 3-phase AC power to a MG 80, to drive the MG 80. AMG controller 10 of the MG drive system 99 is provided with a current controller 30 and the inverter 40.

It should be noted that the MG controller 10 of this embodiment could be applied to a MG drive system that drives two or more MGs.

The inverter 40 is connected to the upper and lower arms of a bridge connection of six switching elements 41 to 46. Specifically, the switching elements 41, 42, 43 are the respective U-phase, V-phase and W-phase upper arm switching elements. The switching elements 44, 45, 46 are the respective U-phase, V-phase and W-phase lower arm switching elements. The switching elements 41 to 46 consist for example of IGBTs (Insulated Gate Bipolar Transistors), each having a reverse-current diode connected in parallel, for allowing current to pass from the low-potential side to the high-potential side.

The inverter 40 converts the DC electric power to AC electric power by operating the switching elements 41 to 46 in accordance with PWM signals UU, UL, VU, VL, WU, WL from the current controller 30. The inverter 40 applies phase voltages Vu, Vv, Vw to respective phase windings 81, 82, 83 of the MG 80 in accordance with a voltage command that is calculated by the current controller 30.

A smoothing capacitor 47 is provided at the input section of the inverter 40, for smoothing the input voltage. An input voltage sensor 48 detects the inverter input voltage Vinv. It should be noted that a voltage boosting converter could be connected between the battery 25 and the inverter 40.

The MG 80 is a 3-phase AC motor, such as a permanent-magnet synchronous AC motor. With this embodiment, the MG 80 is installed in a hybrid automobile equipped with an engine 91. The MG 80 has both the function of an electric motor and the function of an electric generator. Specifically, the MG 80 has the function of an electric motor which generates torque for driving a drive shaft 95. The MG 80 also has the function of an electric generator which regenerates energy that is produced by torque transferred from the engine 91 and drive shaft 95. Furthermore the MG 80 is connected via a speed changing mechanism such as a gear 93, for example, to the road wheels 94. The torque generated by the MG 80 rotates the road wheels 94 via the gear 93. The drive shaft 95 is thereby driven.

Of the three phase windings 81, 82, 83 of the MG 80, current sensors are provided in the current paths that connect the windings of two phases, for detecting phase currents. With this embodiment, as shown in FIG. 1, the current paths which connect the V phase winding 82 and the W phase winding 83 are provided with current sensors 62, 63 for detecting the phase currents Iv, Iw respectively. In this way with this embodiment, the phase current Iu of the U phase is estimated based on Kirchoff's law. It should be noted that it would be equally possible to detect any two phase currents, by current detection methods and the like. It would also be possible to detect the currents of three phases, by other methods. Alternatively, it would be possible to use a technique which uses the detected current value of one of the phases for estimating the currents of the other two phases.

The electrical angle θe, determined by the rotor position of the MG 80, is detected by a position sensor 85, which is a resolver or the like.

The torque command generator 20 generates a torque command value Trq* of the MG 80. With this embodiment, of the vehicle control circuits that judge the overall running condition of the vehicle and control driving of the vehicle based on various input signals, only a function section for generating torque commands is shown. It should be noted that with this embodiment, images and description of other function sections of the vehicle control circuits, and of control circuits relating to the battery 25 and the engine 91, are omitted.

The current controller 30 acquires the inverter input voltage Vinv, phase currents Iv, Iw, and the electrical angle θe that are detected by the above-mentioned sensors. Furthermore the torque command value Trq* from the torque command generator 20, which is a high-level control circuit, is inputted to the current controller 30. Based on these items of information, the current control 30 calculates the PWM signals UU, UL, VU, VL, WU, WL, as drive signals for driving the inverter 40. The inverter 40 performs electric power conversion by operating the switching elements 41 to 46 in accordance with these PWM signals UU, UL, VU, VL, WU, WL. The inverter 40 then outputs electric power to the MG 80 in accordance with the commands from the current controller 30.

It should be noted that the drive signals for driving the inverter 40 are not necessarily limited to PWM signals. It would be equally possible for the drive signals to be signals that are determined by pulse patterns, etc. However it is desirable that high-frequency components in the current which energizes the MG 80 should be limited as far as possible.

In the current control of the MG 80, high-order components are superimposed on the fundamental wave component of the phase current, due to magnetic unbalance of the rotor magnets, the shapes of the rotor and stator, etc. As a result, iron losses and the NV characteristics (audible noise and vibration characteristics) will be affected in accordance with the proportion of high-order components relative to the fundamental wave.

In particular in the case of the MG drive system 99 of a hybrid vehicle, where the requirements relating to iron losses and the NV characteristics are especially severe, it is necessary for specific orders of high-order currents to be controlled to required values. Here, "required value" signifies a value which in some cases may be required to be zero, depending upon an operating point that is reflected in the operating conditions of the vehicle and upon required characteristics of the vehicle, etc. Furthermore in some cases, it will be desirable for the required value to be set as a prescribed value which is other than zero.

Reference document PTL 1 (JP 3809783 B) discloses a motor control apparatus which performs DC transformation by high-order dq transformation of high-order components of the actual current, and which applies feedback control with respect to a high-order current command value that is set as zero.

With the MG controller 10 of the present embodiment, a current controller 30 is provided for resolving a problem of the technology disclosed in reference document PTL 1. The configuration of the current controller 30 of this embodiment is described in detail in the following.

[Configuration and Action of Current Controller]

The configuration and action relating to the current controller 30 of this embodiment will be described referring to FIGS. 2 to 8.

The current controller 30 is made up of a microcomputer, etc., equipped with a CPU, ROM, I/O unit, and bus lines etc., for connecting these. The current controller 30 performs control through execution by the CPU of a program that has been stored beforehand in the ROM, etc., (software control processing), and executes control through dedicated electronic circuits (hardware control processing).

Figure 2:
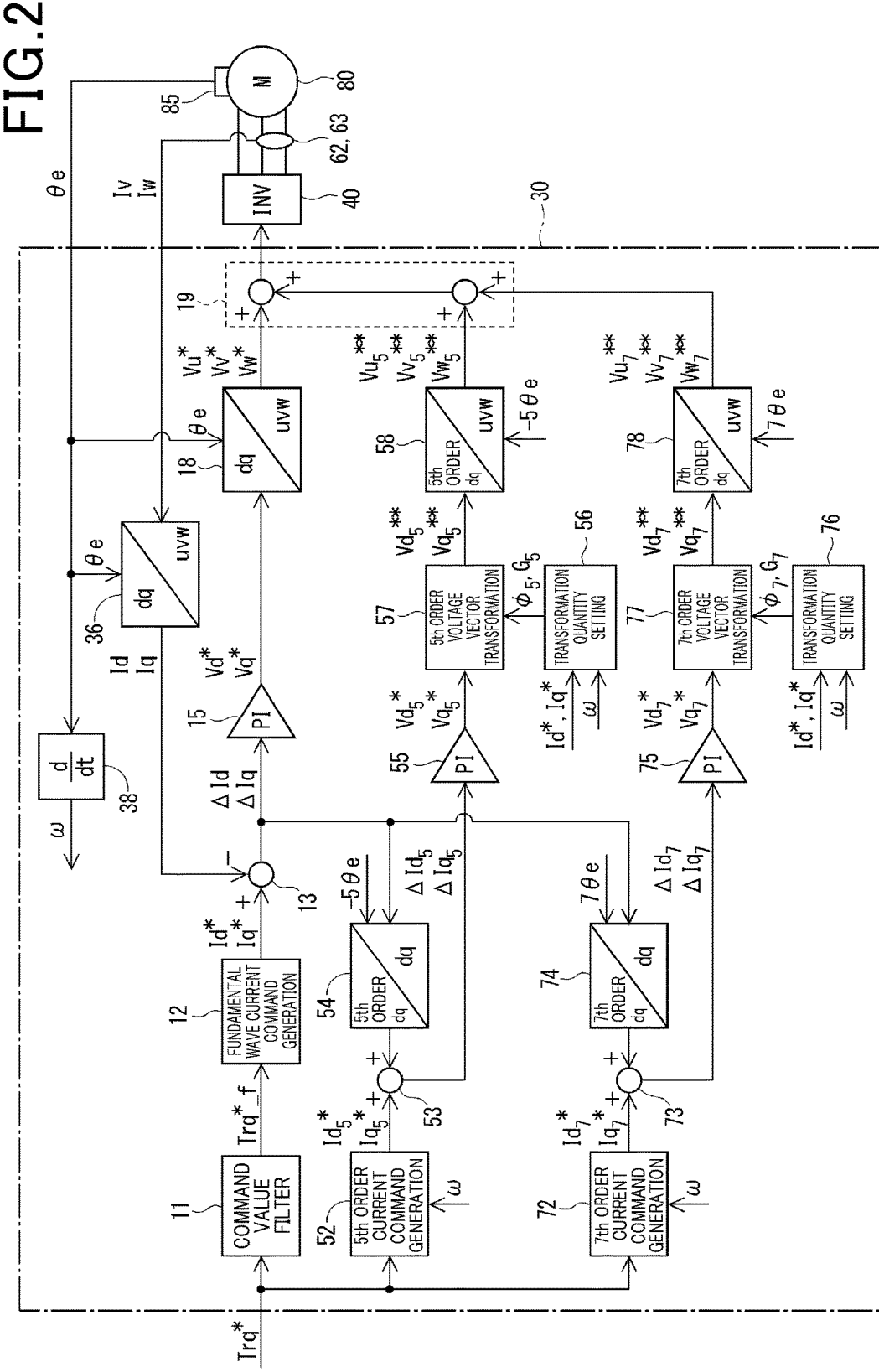
FIG. 2 is a control block diagram of a current controller.

FIG. 2 exemplifies the control blocks of the current controller 30. The current controller 30 has control blocks of a fundamental wave current control system, and control blocks of a high-order current control system. The "fundamental wave current control" consists of control for causing the first-order component of the feedback current to coincide with the current command vector of the fundamental wave in dq coordinates. The "high-order current control" consists of control for causing one or more specific high-order components, extracted from the actual feedback current, to coincide with the high-order current command vector in high-order dq coordinates.

This embodiment, whose drive object is a 3-phase AC motor, shows an example in which the specific orders are the $5^{th}$ order and the $7^{th}$ order. Hence the control block of the high-order current control system is further divided into respective control blocks of a $5^{th}$ order current control system and of a $7^{th}$ order current control system. It should be noted that the phase current $5^{th}$ order component has a frequency which is 5 times that of the phase current $1^{st}$ order component. The 7th order component has a frequency which is 7 times that of the phase current $1^{st}$ order component.

A 2-digit number is used as the reference code for the control blocks. Specifically, the second digit of the 2-digit number is "1" in the case of the fundamental wave current control system, is "5" in the case of the $5^{th}$ order current control system, and is "7" in the case of the $7^{th}$ order current control system, while the first digits are made to mutually correspond.

Furthermore, with respect to the reference numerals of the respective control blocks that process the feedback information from the current sensors 62, 63 and the position sensor 85, these are 2-digit numbers in which the second digit is set as "3". A differentiator 38, which is not included in the above control systems, will first be described. The differentiator 38 performs differentiation with respect to time of the electrical angle θe that is detected by the position sensor 85, for calculating the electrical angular velocity ω [deg/s]. The electrical angular velocity ω is converted to a speed of rotation N [rpm] by multiplying by a constant of proportionality. Hence in this description, the expression "rotation speed ω" is used for "speed of rotation obtained by converting the electrical angular velocity ω".

In the following, features of the respective control blocks will be described after providing a general description.

Firstly, the configuration relating to the fundamental wave current control system will be described.

The control block of the fundamental wave current control system has a command value filter 11, a fundamental wave current command generating section 12, a fundamental wave current deviation calculation section 13, a fundamental wave voltage command calculation section 15, a 3-phase transformation section 18, a high-order voltage component superimposing section 19, and an actual current dq transformation section 36.

The command value filter 11 is a first-order delay filter. The command value filter 11 performs filter processing of the torque command value Trq* that is obtained from the torque command generator 20. The technical definition of filter processing will be described in the following.

The fundamental wave current command generating section 12 generates the fundamental wave current command value Id*, Iq* in dq coordinates, based on the torque command value Trq*_f after filter processing by the command value filter 11. It would be equally possible to perform this current command value generating processing by referring to a map (corresponding data) that has been stored beforehand in a storage medium, or by calculation using prescribed equations, etc. That is also true for the respective $5^{th}$ order and $7^{th}$ order high-order current command value processing.

In the following, there are cases in which a current or voltage in dq coordinates will be expressed as a current value or voltage value, or as a current vector or voltage vector. In principle, the expression "value" is assigned to a d-axis current value (or voltage value) that is a scalar quantity, or is assigned to a q-axis current value (or voltage value) that is a scalar quantity. On the other hand, in the case of the expression "vector", this is assigned to a vector having defined magnitude and phase with respect to the coordinates. In particular in the case of high-order vector transformation processing for high-order current control, "vector" is used when speaking of phase.

Essentially, in describing the current controller 30, which basically performs vector control, it can be considered that "vector" is used for all of the dq-axes currents and dq-axes voltages. However in the present specification, to avoid redundancy, "value" is used except in cases in which the use of "vector" is clearly more suitable.

Based on the electrical angle θe that is detected by the position sensor 85, the actual current dq transformation section 36 performs coordinate transformation of the phase currents Iv, Iw of the fixed coordinate system, detected by the current sensors 62, 63 to the dq-axis currents Id, Iq of the rotating coordinate system. These dq-axis currents Id, Iq are fed back to the fundamental wave current deviation calculation section 13 as actual currents which are actually passed to energize the MG 80.

High-order components which are the phase current $5^{th}$ order component and the phase current $7^{th}$ order component are superimposed on the phase current $1^{st}$ order component. Strictly speaking, other than the $5^{th}$ and the $7^{th}$ order, it is possible for $(6n\pm1)^{th}$ order components (where n is a natural number), i.e., the $11^{th}$ order, $13^{th}$ order, $17^{th}$ order, $19^{th}$ order, etc to be superimposed. With this embodiment, for ease of description, the $11^{th}$ order and higher order components are omitted, and only the $5^{th}$ and the $7^{th}$ order phase current components will be mentioned. The phase current $5^{th}$ order component and phase current $7^{th}$ order component are converted by dq transformation to a dq-axes current $6^{th}$ order component.

It should be noted that in the following description, negative orders are defined, with the nomenclature "phase current $(-5)^{th}$ order", "dq-axes $(-6)^{th}$ order", etc., being used. On the other hand in this case, no distinction is made between the positive and negative signs, which are expressed by absolute values.

The fundamental wave current deviation calculation section 13 calculates the fundamental wave current deviation ΔId, ΔIq, which is the difference between the fundamental wave current command value Id*, Iq* generated by the fundamental wave current command generating section 12 and the actual current Id, Iq that is fed back from the actual current dq transformation section 36. The fundamental wave current deviation ΔId, ΔIq can be considered as corresponding to a $6^{th}$ order component in the dq coordinates, as described hereinafter.

The fundamental wave voltage command calculation section 15 is configured for example by a PI controller. The fundamental wave voltage command calculation section 15 calculates the dq-axes voltage command values Vd*, Vq* by PI control calculations such as to make the fundamental wave current deviations ΔId, ΔIq respectively converge to 0 (zero).

The 3-phase transformation section 18 performs coordinate transformation for converting the dq-axes voltage command values Vd*, Vq* to the 3-phase voltage command values Vu*, Vv*, Vw*, based on the electrical angle θe. In the following, the 3-phase voltage command values Vu*, Vv*, Vw* are expressed as "Vuvw*". The high-order 3-phase voltage command values are similarly expressed as "Vuvw$_5$, Vuvw$_7$".

The high-order voltage component superimposing section 19 superimposes the $5^{th}$ order and $7^{th}$ order 3-phase voltage command values Vuvw$_5$, Vuvw$_7$, that are calculated by respective blocks of the $5^{th}$ order and $7^{th}$ order current control systems, on the 3-phase voltage command values Vuvw* of the fundamental wave. FIG. 2 shows an example in which the $5^{th}$ order voltage command values Vuvw$_5$ and the $7^{th}$ order voltage command values Vuvw$_7$ are added together, and the 3-phase voltage command values Vuvw* of the fundamental wave are then added. That is to say, in the example of FIG. 2, the 3-phase voltage command values are calculated in two stages. It should be noted that the calculation method is not limited to this. As other methods of calculation, the additions may be performed irrespective of the calculation sequence, or the additions may be performed in a single stage.

In FIG. 2, the control blocks between the high-order voltage component superimposing section 19 and the inverter 40 are omitted. A voltage duty ratio transformation section and a PWM signal generating section is provided between these.

The voltage duty ratio transformation section converts the 3-phase voltage command values Vuvw* of the fundamental wave to command duty ratios. In this transformation calculation, information on the inverter input voltage Vinv is used. The PWM signal transformation section calculates PWM signals UU, UL, VLU, VL, WU, WL by PWM transformation, based on the command duty ratios and PWM modulation, and outputs these signals to the inverter 40. Since PWM control is a known technology, detailed description is omitted.

Figure 3:
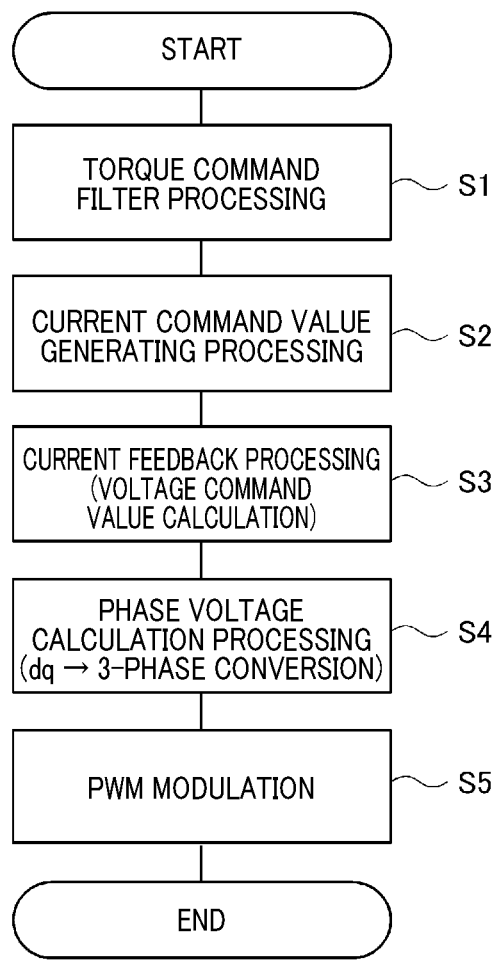
FIG. 3 is flow diagram showing the outline of fundamental wave current control processing.

FIG. 3 shows the general flow of the fundamental wave current control processing that is executed by the control blocks of the fundamental wave current control system. The designation "S" in the flow diagram designates a processing stage (step).

The command value filter 11 executes torque command filter processing (step S1).

The fundamental wave current command generating section 12 executes processing for generating the fundamental wave current command values Id*, Iq* in dq coordinates, based on the torque command value Trq*_f after filter processing (step S2).

The actual current dq transformation section 36 and the fundamental wave current deviation calculation section 13 perform current feedback processing with respect to the fundamental wave current command values Id*, Iq*. The fundamental wave voltage command calculation section 15 calculates the dq-axes voltage command values Vd*, Vq* of the fundamental wave (step S3).

The 3-phase transformation section 18 performs coordinate transformation of the dq-axes voltage command values Vd*, Vq*, and performs phase voltage calculation (step S4).

The PWM signal generating section executes PWM modulation (step S5).

The configuration related to high-order current control will next be described.

The control blocks of the $5^{th}$ order current control system are a $5^{th}$ order current command generating section 52, a $5^{th}$ order current deviation calculation section 53, a $5^{th}$ order dq transformation section 54, a $5^{th}$ order voltage command calculation section 55, a transformation quantity setting section 56, a $5^{th}$ order voltage vector transformation section 57 and a 3-phase transformation section 58.

The $5^{th}$ order current command generating section 52 generates the $5^{th}$ order dq-axes current command values Id$_5$*, Iq$_5$* by referring to a map (data correspondence) in accordance with the torque command value Trq* and the speed of rotation ω of the MG 80. As described above, the desired value of the $5^{th}$ order current could equally be set as "Id$_5$*=0, Iq$_5$*=0" from the iron losses and the NV characteristic required for the system, or could be set to a target value other than 0.

Based on "−5θe" which is the (−5) times angular multiple of the electrical angle θe, the $5^{th}$ order dq transformation section 54 performs high-order dq transformation for converting the fundamental wave current deviation ΔId, ΔIq ($6^{th}$ order component in the dq coordinate system) to the $5^{th}$ order dq coordinate system, which is a high-order dq coordinate system. As a result of this, the $5^{th}$ order dq transformation section 54 extracts the phase current $5^{th}$ order component contained in the actual current. In the following, the order such as that of the "5$^{th}$ order dq transformation" is expressed using the absolute value of the order in a fixed coordinate system. The meaning of the negative sign in "−5θe" will be explained hereinafter.

The 5$^{th}$ order current deviation calculation section 53 calculates the 5$^{th}$ order current deviation ΔId$_5$, ΔIq$_5$ as the difference between the 5$^{th}$ order dq-axes current command values Id$_5$*, Iq$_5$* that are generated by the 5$^{th}$ order current command generating section 52 and the 5$^{th}$ order dq converted values that are obtained through high-order dq transformation by the 5$^{th}$ order dq transformation section 54.

Here, the output from the fundamental wave current deviation calculation section 13 reflects the value of actual current Id, Iq calculated as a negative value. Hence, the input from the 5$^{th}$ order dq transformation section 54 to the 5$^{th}$ order current deviation calculation section 53 is expressed positively, and a negative quantity is subtracted. That is to say, in the 5$^{th}$ order current deviation calculation section 53, the 5$^{th}$ order dq-axes current command values Id$_5$*, Iq$_5$* are subtracted by a negative quantity.

The 5$^{th}$ order voltage command calculation section 55 can be configured for example as a PI controller. The 5$^{th}$ order voltage command calculation section 55 calculates the 5$^{th}$ order voltage command values ΔVd$_5$*, ΔVq$_5$* through PI control calculation, such as to make the 5$^{th}$ order current deviations ΔId$_5$*, ΔIq$_5$* respectively converge to 0 (zero).

The 5$^{th}$ order voltage vector transformation section 57 executes "high-order vector transformation processing" in 5$^{th}$ order dq coordinates, on the 5$^{th}$ order voltage command values ΔVd$_5$*, ΔVq$_5$* that are calculated by the 5$^{th}$ order voltage command calculation section 55. The 5$^{th}$ order voltage vector transformation section 57 outputs a 5$^{th}$ order dq-axes voltage command vector Vd$_5$, Vq$_5$, after transformation.

The high-order vector transformation processing includes at least "rotation transformation" which rotates the phase of the 5$^{th}$ order voltage command vector Vd$_5$*, Vq$_5$* in accordance with a prescribed rotation angle φ$_5$. The rotation angle φ$_5$ excludes 2nπ (where n is an integer) [rad].

Furthermore it would be equally possible for the high-order vector transformation processing to include "amplitude transformation" for multiplying the amplitude of the 5$^{th}$ order voltage command vector Vd$_5$*, Vq$_5$* by a gain G$_5$ which is other than 1 times. Alternatively stated, if the gain G$_5$ is 1, then only processing for rotation transformation is performed, without amplitude transformation.

The rotation angle φ$_5$ of the rotation transformation and the gain G$_5$ of the amplitude transformation which are the transformation quantities of the high-order vector transformation processing, are set by the transformation quantity setting section 56. With the present embodiment, the transformation quantity setting section 56 sets the rotation angle φ$_5$ of the rotation transformation and the gain G$_5$ of the amplitude transformation in accordance with the fundamental wave current command values Id*, Iq* and the speed of rotation ω.

The technical meaning of high-order transformation processing is described in detail hereinafter.

Based on "−5θe" ((−5) times angle) which is a value obtained by multiplying the electrical angle θe by −5, the 3-phase transformation section 58 performs coordinate transformation of the dq-axes voltage command values Vd$_5$, Vq$_5$ to the 3-phase voltage command values Vuvw$_5$, following the vector transformation processing of these dq-axes voltage command values Vd$_5$, Vq$_5$. The 5$^{th}$ order 3-phase voltage command values Vuvw$_5$ are superimposed on the 3-phase voltage command values Vuvw$_5$* of the fundamental wave by the high-order voltage component superimposing section 19.

The control blocks of the 7$^{th}$ order current control system are a 7$^{th}$ order current command generating section 72, a 7$^{th}$ order current deviation calculation section 73, a 7$^{th}$ order dq transformation section 74, a 7$^{th}$ order voltage command calculation section 75, a transformation quantity setting section 76, a 7$^{th}$ order voltage vector transformation section 77 and a 3-phase transformation section 78. The configurations of the respective control blocks are the same as those of the 5$^{th}$ order current control system. It should be particularly noted that the 7$^{th}$ order dq transformation section 74 performs high-order dq transformation of the fundamental wave current deviations ΔId, ΔIq to the 7$^{th}$ order dq coordinate system, based on "−7θe" ((−7) times angle) which is a value obtained by multiplying the electrical angle θe by −7. Through this, the 7$^{th}$ order dq transformation section 74 extracts the phase current 7$^{th}$ order component contained in the actual current. Other points are similar to those of the 5$^{th}$ order current control system, so that description is omitted.

Next, basic items of fundamental wave and high-order current control relating to the present embodiment will be described referring to FIGS. 4 to 6.

The dq transformation of the phase current k$^{th}$ component from the fixed coordinate system to the dq coordinate system is expressed by equation (1). The "φd$_k$" in equation (1) signifies the phase of the k$^{th}$ component vector with reference to the d-axis, in dq coordinates. Furthermore, "Ir$_k$" signifies the magnitude of the current vector of the k$^{th}$ component.

[Formula 1]

$$\begin{bmatrix} I_{dk} \\ I_{qk} \end{bmatrix} = \sqrt{\frac{2}{3}} \begin{bmatrix} \cos\theta e & \cos\left(\theta e - \frac{2}{3}\pi\right) & \cos\left(\theta e + \frac{2}{3}\pi\right) \\ -\sin\theta e & -\sin\left(\theta e - \frac{2}{3}\pi\right) & -\sin\left(\theta e + \frac{2}{3}\pi\right) \end{bmatrix} \quad (1)$$

$$\sqrt{\frac{2}{3}} \begin{bmatrix} I_{rk}\cos(k\theta e + \phi_{dk}) \\ I_{rk}\cos\left(k\theta e - \frac{2}{3}\pi + \phi_{dk}\right) \\ I_{rk}\cos\left(k\theta e + \frac{2}{3}\pi + \phi_{dk}\right) \end{bmatrix}$$

$$= \begin{bmatrix} I_{rk}\cos\{(k-1)\theta e + \phi_{dk}\} \\ I_{rk}\sin\{(k-1)\theta e + \phi_{dk}\} \end{bmatrix}$$

Table (1) shows the correspondence relationship, based on the equation (1), between the orders in a fixed coordinate system and the orders in a dq coordinate system.

TABLE 1

| Fixed Coordinates | dq Coordinates |
|---|---|
| 1st order | DC |
| −5$^{th}$ order | −6$^{th}$ order |
| 7$^{th}$ order | 6$^{th}$ order |
| k$^{th}$ order | (k − 1)$^{th}$ order |

Here, the k$^{th}$ order with the 1$^{st}$ order excluded is expressed by equation (2.1). In equation (2.1), the case of n=0 corresponds to the 1$^{st}$-order (fundamental wave). Furthermore the case of n=1 corresponds to the (−5)$^{th}$ order and the 7$^{th}$ order.

$$K = 1 \pm 6n \text{ (where } n \text{ is a natural number)} \quad (2.1)$$

Furthermore, in the case of the order being without distinction between positive and negative, the absolute value of k is expressed by equation (2.2)

$$|K|=|1\pm 6n|=6n\pm 1 \text{ (where } n \text{ is a natural number)} \qquad (2.2)$$

The meaning of the negative order in equation (2.1) is as follows.

In a fixed coordinate system, when the phase sequence of the 3 phases is opposite to that of the fundamental wave, the order is taken to be negative. For example if the phase sequence of the fundamental wave is UVW, then the order of the high-order components, when the phase sequence is UWV, is expressed as being negative.

In the dq coordinate system, when the rotation direction of the high-order components is counterclockwise (leftward rotation), the order is taken to be positive, while when it is clockwise (rightward rotation), the order is taken to be negative.

In general, the $(k-1)^{th}$ order in the dq coordinate system corresponds to the $k^{th}$ order in the fixed coordinate system. Specifically, the $(-6)^{th}$ order in the dq coordinate system corresponds to the $(-5)^{th}$ order in the fixed coordinate system, while the $6^{th}$ order in the dq coordinate system corresponds to the $7^{th}$ order in the fixed coordinate system. Hence, the $(-5)^{th}$ order component of the phase current and the $7^{th}$ order component of the phase current contribute to $6^{th}$ order variations in the torque of the 3-phase AC motor.

Furthermore, this corresponds to the "cos(kθe)" term in equation (1), and the angle that is inputted to the 5th order dq transformation section 54 and the 3-phase transformation section 58 in FIG. 2 becomes "−5θe"

FIG. 4 shows an example of the relationship between the fixed coordinate system and the dq coordinate system, for the fundamental wave. It is assumed that the phase sequence of the fundamental wave in the fixed coordinate system is UVW.

Designating the magnitude of the dq-axes current vector as Ir1, the amplitude of the phase current is expressed by $[\sqrt{(2/3)}]Ir_1$. Furthermore the phase $\phi d_1$ corresponds to the maximum value taken by the U-phase current, for example, when the reference is the electrical angle 0° with respect to fixed coordinates.

FIG. 5 shows an example of the relationship between the fixed coordinate system and the $5^{th}$ order dq coordinate system, for the phase current $(-5)^{th}$ order component. Since the phase sequence in the fixed coordinate system is UWV, which is the reverse of the phase sequence of the fundamental wave, the phase sequence in the fixed coordinate system is expressed as a negative order.

The $5^{th}$ order dq current vector rotates 6 times in each electrical period, with the end point of the 1st-order dq-axes vector as center, rotating clockwise in $5^{th}$ order coordinates. Designating the magnitude of the dq-axes current vector as $Ir_5$, which corresponds to the radius of rotation, the magnitude of the phase current $(-5)^{th}$ order component is expressed as $[\sqrt{(2/3)}]Ir_5$.

Furthermore the phase of the $5^{th}$ order dq-axes current vector is expressed as "−6θe+$\phi d_5$". The phase $\phi d_5$ corresponds, for example, to the maximum phase reached by the U-phase current, when the reference is the electrical angle 0° with respect to fixed coordinates The high-order components that are superimposed on the phase current appear in the dq-axes current as AC components, in accordance with the order. High-order transformation is a method of converting the high-order components that are superimposed on a phase current to direct current, and controlling to desired values.

Figure 6:
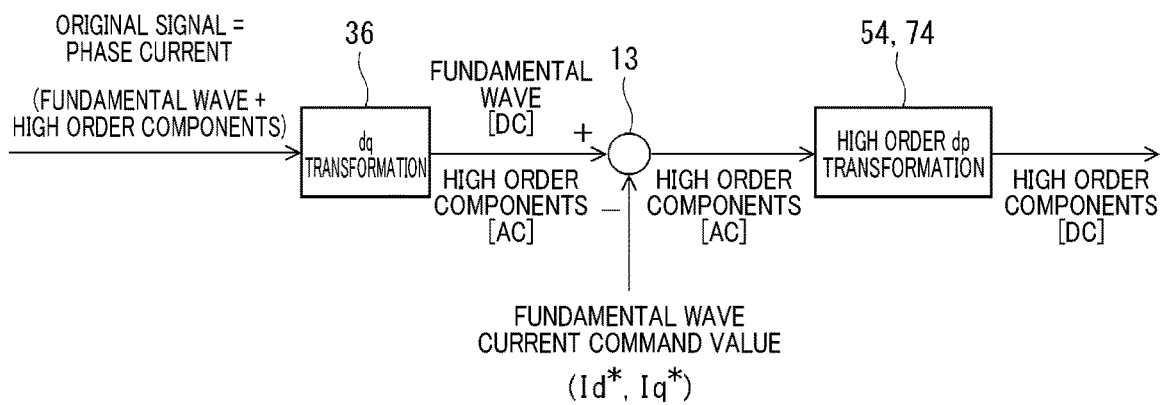
FIG. 6 is a control block diagram for describing dq transformation and high-order dq transformation

With the present embodiment, as shown in FIG. 6, after temporarily converting the phase currents of the fixed coordinate system to the dq coordinate system, these are converted to a high-order dq coordinate system. FIG. 6 corresponds to a diagram of the control blocks relating to dq transformation and high-order dq transformation, extracted from those of FIG. 2. For convenience of description, the "+/−" signs for the fundamental wave current deviation calculation section 13 are indicated as opposite to those in FIG. 2.

The transformation expression "fixed coordinate system→dq coordinate system→high-order dq coordinate system" in FIG. 6 is expressed by equation (3).

[Formula 2]

$$\begin{bmatrix} I_{dk} \\ I_{qk} \end{bmatrix} = \begin{bmatrix} \cos(k-1)\theta e & \sin(k-1)\theta e \\ -\sin(k-1)\theta e & \cos(k-1)\theta e \end{bmatrix} \qquad (3)$$
$$\begin{bmatrix} I_{rk}\cos\{(k-1)\theta e + \phi_{dk}\} \\ I_{rk}\sin\{(k-1)\theta e + \phi_{dk}\} \end{bmatrix}$$
$$= I_{rk} \begin{bmatrix} \cos\phi_{dk} \\ \sin\phi_{dk} \end{bmatrix}$$

As shown in FIG. 6, high-order components are superimposed on the fundamental wave, in the phase current which is the original signal. The fundamental wave is converted to direct current by the actual current dq transformation section 36. The fundamental wave current deviation calculation section 13 subtracts the fundamental wave current command value Id*, Iq* from the actual current after dq transformation. In this way, the high-order components of the AC are left remaining. The high-order dq transformation sections ($5^{th}$ order dq transformation section, $7^{th}$ order dq transformation section) 54, 74 perform high-order dq transformation of the high-order AC components, and convert to direct current.

The above is a description of the basic items of the fundamental wave and high-order current control. With this embodiment, specific orders of high-order components are converted to direct current by means of high-order dq transformation. The current controller 30 of this embodiment thereby performs feedback control with respect to respective orders of high-order command values.

Next, a technical definition of the filter processing used by the command value filter 11 of this embodiment will be described, referring to FIGS. 7A and 7B.

Figure 7A:
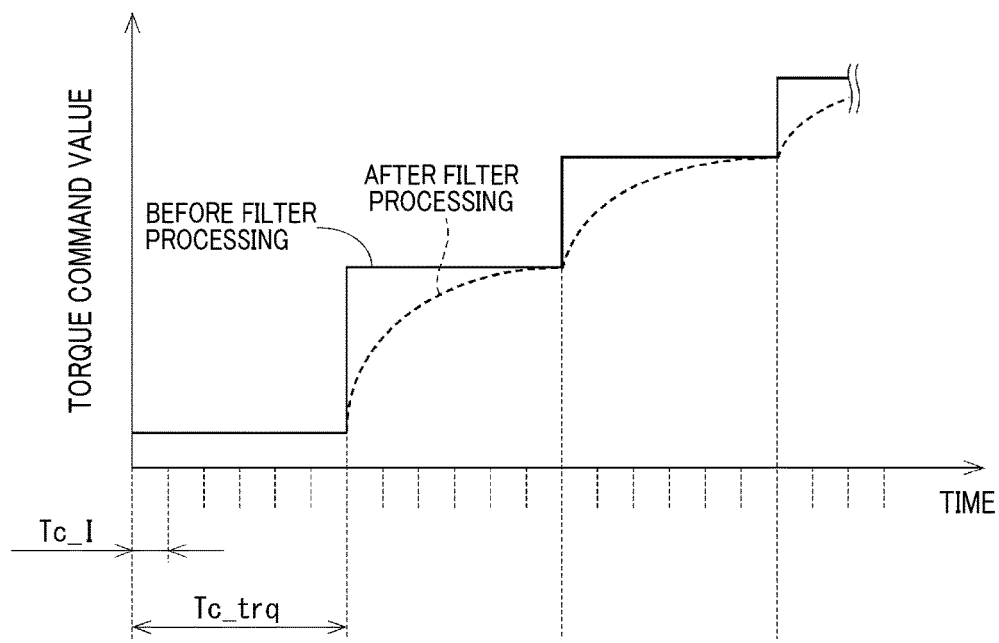
FIG. 7A is a diagram for describing smoothing processing of a torque command value by a command value filter.

As shown in FIG. 7A, in the motor control, the calculation period Tc_trq of the torque command generator 20 is in general set to be longer than the calculation period Tc_I of the current controller 30. Hence the calculated torque command values are inputted in a stepwise manner to the current controller 30, which performs calculation with a relatively short period. Furthermore the responsiveness (calculation period of current control) of the current controller 30 is rapid, by comparison with the calculation period of the torque commands. For that reason, if the inputs (inputted torque commands) to the current controller 30 from the torque command generator 20 were to be used unchanged for control, then the actual torque would be outputted from the MG 80 in a stepwise manner. As a result, for example in the case of application to a hybrid vehicle, there is a danger that the drivability would be affected.

Hence with this embodiment, filter processing is executed by the command value filter 11 of the current controller 30, for making the response of the torque command value Trq* smooth. That is to say, the current controller 30 of this embodiment executes "smoothing processing".

Figure 7B:
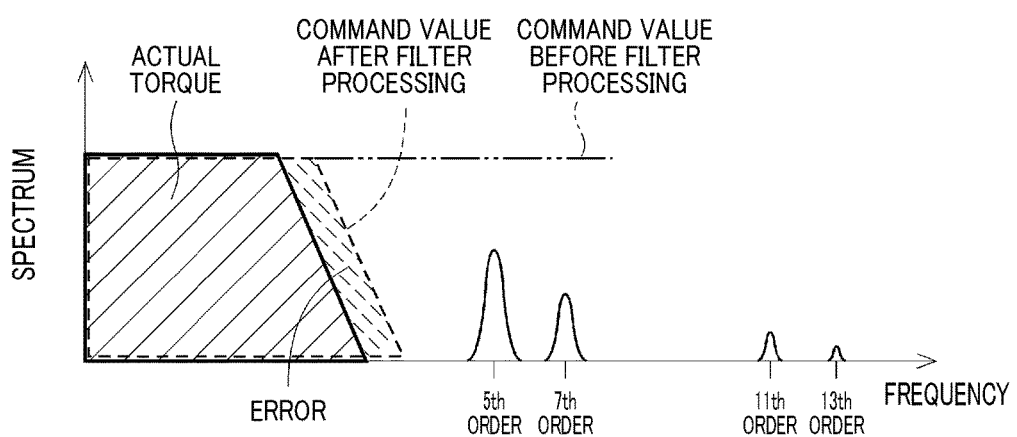
FIG. 7B is an image diagram showing a spectrum of an actual torque and of a torque command value before and after smoothing processing.

As shown in FIG. 7B, the spectrum of the command value Trq* prior to filter processing contains high-frequency components extending over the entire frequency domain. On the other hand, in the spectrum of the command value Trq* following the filter processing by the command value filter 11, the high-frequency components that were included in the command value Trq* prior to filter processing have been removed. There is some degree of error in the current response, however the spectrum of the command value Trq*_f following the filter processing is close to the spectrum of the actual torque.

The solid-line frame in FIG. 7B shows an image of an example of the spectrum range of the actual torque, while the dashed-line frame shows an image of an example of the spectrum range of the command value Trq*_f after filter processing. These frames signify that the main spectrum is within them.

In this way, with this embodiment, the spectrum of the command value Trq*_f after filter processing mainly contains the 1st-order component, and does not contain high-order components of the $5^{th}$ order and above. Hence, the current controller 30 of this embodiment can extract the high-order components contained in the actual current Id, Iq, using the current command value Id*, Iq* that is generated from the torque command value Trq*_f after filter processing.

PTL 1 (JP 3809783 B) discloses a technology for extracting the high-order components by using a high-pass filter or a current response model. However if the high-pass filter is used, a problem arises with respect to a residual fundamental wave component. Furthermore in the case of using the current response model, the problem arises of an increase in processing load that is caused by the filter calculation processing.

However with the present embodiment, the high-order components are extracted from the difference between the actual current Id, Iq and the current command value Id*, Iq* that is generated from the torque command value Trq*_f after filter processing by the command value filter 11. Due to this, the MG controller 10 of this embodiment can avoid the problems of the residual fundamental wave component, etc., that arise when a high-pass filter is used. Furthermore the MG controller 10 of this embodiment can extract the appropriate high-order components without adding to the processing load, such as occurs in the case of using the current response model. As a result, the MG controller 10 of this embodiment can reduce the processing time.

Next, a technical definition of the high-order vector transformation processing performed by the 5th order voltage vector transformation section 57 and the 7th order voltage vector transformation section 77 of the present embodiment will be described referring to FIGS. 8A to 8C.

Figure 8A:
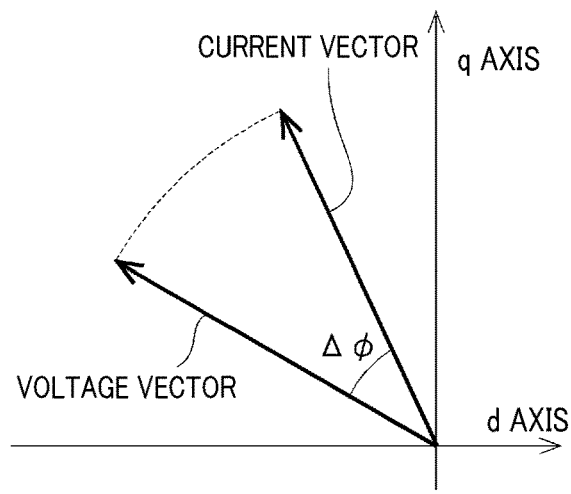
FIG. 8A is a diagram showing a phase difference between a voltage vector and a current vector.

As shown in FIG. 8A, in general, the phases of a voltage vector and of a current vector in dq coordinates do not coincide, and there is a phase difference $\Delta\phi$ between them. If the phase difference $\Delta\phi$ between a high-order voltage vector and a high-order current vector is large, then, depending upon the configuration and characteristics of the AC motor, motor control may become unstable in some cases.

In the feed-forward term of the voltage equation of the fundamental wave current control, the d-axis voltage command value is calculated from the q-axis current deviation, and the q-axis voltage command value is calculated from the d-axis current deviation. In such fundamental wave current control, non-interference control is known, which controls the d-axis component and the q-axis component independently. However, the use of non-interference control for high-order current control has not been considered.

In contrast, with the present embodiment, transformation is applied for making, for example, 5th order or 7th order, the high-order current vector and the high-order voltage vector coincide in phase, by effecting vector rotation. This high-order current vector transformation processing is executed on the high-order current vector deviations that are inputted to the 5th order voltage command calculation section 55 and the 7th order voltage command calculation section 75. Furthermore the high-order current vector transformation processing is executed on the high-order voltage command vector that is calculated through feedback control.

Furthermore, in the high-order vector transformation processing, it would be equally possible to perform magnitude transformation of the magnitude of the vector concurrently with the rotation transformation.

Figure 8B:
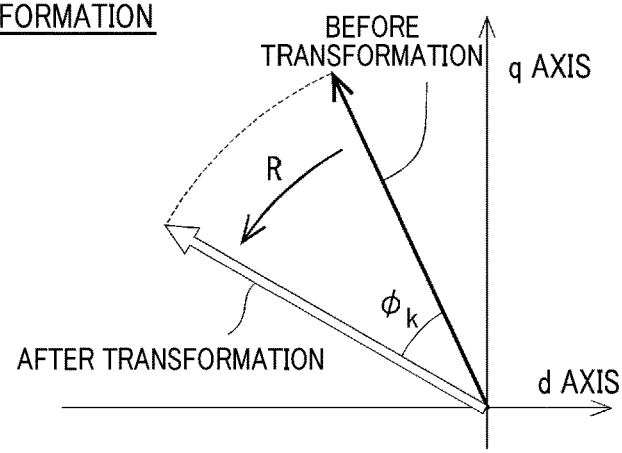
FIG. 8B is an image diagram of a case in which only rotation transformation is applied in high-order vector transformation processing.
Figure 8C:
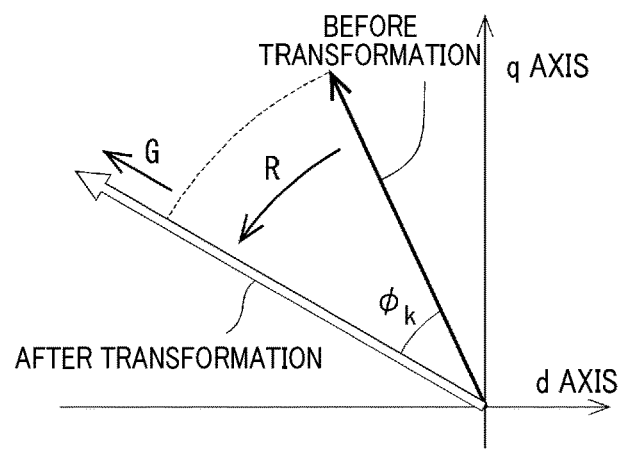
FIG. 8C is an image diagram of a case in which rotation transformation and amplitude transformation are applied concurrently in high-order vector transformation processing.

FIG. 8B shows an example of a case in which only rotation transformation (R) is applied in the high-order vector transformation processing. FIG. 8C shows an example of a case in which both rotation transformation (R) and magnitude transformation (G) are applied concurrently in the high-order vector transformation processing. It should be noted that in general, the rotation angle $\phi_k$ indicates rotation transformation of a $k^{th}$ order vector.

With this embodiment as shown in FIG. 2, the $5^{th}$ order voltage command vector $Vd_5^*$, $Vq_5^*$ that is calculated by the $5^{th}$ order voltage command calculation section 55 and the $7^{th}$ order voltage command vector $Vd_7^*$, $Vq_7^*$ that is calculated by the 7th order voltage command calculation section 75 are rotated. The high-order rotation transformation processing executed by the 5th order voltage vector transformation section 57 and the 7th order voltage vector transformation section 77 are respectively expressed by equation (4.1) and equation (4.2), which contain rotation matrices.

[Formula 3]

$$\begin{bmatrix} Vd_5^{} \\ Vq_5^{} \end{bmatrix} = G_5 \begin{bmatrix} \cos\phi_5 & \sin\phi_5 \\ -\sin\phi_5 & \cos\phi_5 \end{bmatrix} \begin{bmatrix} Vd_5^* \\ Vq_5^* \end{bmatrix} \quad (4.1)$$

$$\begin{bmatrix} Vd_7^{} \\ Vq_7^{} \end{bmatrix} = G_7 \begin{bmatrix} \cos\phi_7 & \sin\phi_7 \\ -\sin\phi_7 & \cos\phi_7 \end{bmatrix} \begin{bmatrix} Vd_7^* \\ Vq_7^* \end{bmatrix} \quad (4.2)$$

In general, with regard to the $5^{th}$ order current vector deviation $\Delta Id_5$, $\Delta Iq_5$ and the $7^{th}$ order current vector deviation $\Delta Id_7$, $\Delta Iq_7$, the form of executing high-order vector transformation processing is to perform feedback control after the high-order current vector deviation has been rotated. With a current controller having this form, the arrangement of the control blocks "55, 75" and "57, 77" is reversed from that of the configuration shown in FIG. 2. Furthermore instead of the naming "$5^{th}$ order/$7^{th}$ order voltage vector transformation section" control block, for the "57, 77" control blocks, the naming "$5^{th}$ order/$7^{th}$ order vector deviation transformation section" is applied. With the technology of this embodiment, a control block is included for executing high-order vector transformation processing in the above-described two ways, with that control block being referred to as the "high-order vector transformation section".

The phase deviation $\Delta\phi$ between the voltage vector and the current vector arises from inductance and rotor-induced voltage of the MG 80. For that reason, the phase deviation Δϕ depends upon operating conditions such as the level of current, speed of rotation, etc. With the transformation quantity setting sections 56, 76 of this embodiment, for example the relationship between the fundamental wave current command value Id*, Iq*, rotation speed ω, phase deviation Δϕ, and the magnitude ratio, which have been measured beforehand, are stored beforehand as a map (correspondence-assigned data). The transformation quantity setting sections 56, 76 then sets the rotation angles $ϕ_5$, $ϕ_7$ and the magnitude transformation gains $G_5$, $G_7$, that are the transformation quantities for the high-order vector transformation processing, in accordance with the fundamental wave current command value Id*, Iq* and the rotation speed ω, by referring to the map.

It should be noted that it would be equally possible for the transformation quantity setting sections 56, 76 to use the actual current Id, Iq or the detected value of torque of the MG 80, as a parameter when referring to the map, instead of using the fundamental wave current command value Id*, Iq*.

In this way with this embodiment, high-order vector transformation processing is executed on the high-order voltage command values $Vd_5^*, Vq_5^*, Vd_7^*, Vq_7^*$ such as to make the high-order voltage vector and high-order current vector coincide in phase. As a result, the motor control apparatus 10 of this embodiment stabilizes motor control. That is also true for the high-order current vector deviations $ΔId_5, ΔIq_5, ΔId_7, ΔIq_7$ that are inputted to the $5^{th}$ order voltage command calculation section 55 and the 7th order voltage command calculation section 75, when executing high-order vector transformation processing.

Furthermore with this embodiment, the rotation angles $ϕ_5$, $ϕ_7$ of rotation transformation and the gains $G_5$, $G_7$ of magnitude transformation are set in accordance with operating conditions, such as values of current, rotation speed, etc. Due to this, the motor control apparatus 10 of this embodiment can maintain constant responsiveness of feedback control, irrespective of the operating point

[Other Embodiments]

(a) With a current controller according to other embodiments, it would be possible to omit the command value filter. For example if the MG controller has sufficient processing power, the high-order components could be extracted by using a current response model. Moreover in the case of a system in which the calculation period of the torque command generating section and the calculation period of the current controller are identical, it is possible that the torque command value Trq* which is inputted to the current controller does not contain high-frequency components. In such a case, the high-order components can be suitably extracted by using the difference between the actual current Id, Iq and a current command value Id*, Iq* that is generated from a torque command value Trq* which does not contain high-frequency components.

(b) With the above embodiment, concerning the motor control apparatus 10 which is applied to the drive system of a 3-phase AC motor, the current controller 30 controls the $5^{th}$ order and $7^{th}$ order components as specific orders, expressed by absolute values. With another embodiment, it would be equally possible for the current controller to control components of respective orders such as the $11^{th}$ order, $13^{th}$ order, $17^{th}$ order, $19^{th}$ order, etc., corresponding to the case of n=2, 3, . . . in equation (2.2).

(c) It would be equally possible for an AC motor, driven by a system to which the technology of the present disclosure is applied, not to also combine the function of an electric generator, as does the MG 80 of the above embodiment. Furthermore the AC motor is not limited to being a permanent magnet type of synchronous motor, and it would be equally possible to use an induction motor, or another type of synchronous motor. Moreover it would be equally possible for the number of phases of a rotary machine constituting the polyphase AC motor to be 4 or more. The specific orders of the high-order components that are to be extracted from the actual current will differ in accordance with the number of phases.

(d) The AC motor control apparatus according to the present disclosure is not limited to an MG drive system for a hybrid automobile or an electric automobile, and could be used as a control system for an AC motor for any application, such as general machinery use, etc.

As described above, the present disclosure is not limited to the above embodiment, and could be implemented in various forms, without departing from the essence of the technology of the disclosure.

DESCRIPTION OF SIGNS

100 . . . MG controller (Control apparatus for AC motor)
30 . . . Current controller
40 . . . Inverter
41 to 46 . . . Switching elements
55, 75 . . . $5^{th}$ order/$7^{th}$ order voltage command calculation sections (high-order voltage command calculation sections)
56, 76 . . . Conversion quantity setting sections
57, 77 . . . $5^{th}$ order/$7^{th}$ order voltage vector transformation sections (high-order vector calculation sections)
80 . . . MG (AC motor)

The invention claimed is:

1. An AC motor control apparatus, comprising:
an inverter which supplies, to a polyphase AC motor, AC power that has been converted by a plurality of switching elements; and
a current controller which calculates drive signals for driving the inverter and controls driving of the AC motor, through fundamental wave current control that makes a 1st-order component of an actual current, which is fed back, coincide with a fundamental wave current command vector in dq coordinates, and through high-order current control that makes one or more specific high-order components, extracted from the actual feedback current, coincide with a high-order current command vector in high-order dq coordinates, wherein
the current controller includes:
a high-order voltage command calculation section that calculates a high-order voltage command vector by means of feedback control which causes a high-order transformation value of a high-order component having a specific order, extracted from the actual current, to coincide with a high-order dq-axes current command value; and
a high-order vector transformation section that executes high-order vector transformation processing on a high-order current vector deviation which is inputted to the high-order voltage command calculation section or on a high-order voltage command vector which is calculated by the high-order voltage command calculation section, such as to cause a high-order voltage vector and a high-order current vector to coincide in phase in high-order dq coordinates, with the high-order vector transformation processing including rotation that rotates a high-order vector.

2. The AC motor control apparatus according to claim 1, wherein
the current controller includes a transformation quantity setting section that sets a rotation angle of the rotation transformation in accordance with a fundamental wave current command value and a rotation speed of the AC motor, where the rotation angle is a transformation quantity used by the high-order vector transformation processing.

3. The AC motor control apparatus according to claim 1, wherein
in addition to rotation transformation, the high-order vector transformation processing includes magnitude transformation which multiplies the magnitude of the high-order vector by a gain that is other than 1.

4. The AC motor control apparatus according to claim 3, wherein
the current controller includes a transformation quantity setting section which sets a rotation angle of the rotation transformation and a gain of the magnitude transformation in accordance with a fundamental wave current command value and a rotation speed of the AC motor, where the rotation angle and the gain are transformation quantities used by the high-order vector transformation processing.

5. The AC motor control apparatus according to claim 1, wherein
the polyphase AC motor is a 3-phase AC motor, and
the current controller extracts $(6n\pm1)^{th}$ order high-order components, where n is a natural number, as the high-order components of the specific order.

* * * * *